United States Patent [19]
Rydborn

[11] Patent Number: 5,424,557
[45] Date of Patent: Jun. 13, 1995

[54] APPARATUS FOR MONITORING WEFTS OR THREADS

[76] Inventor: Sten Å. O. Rydborn, Klöxhultsvägen 21, 343 00 Älmhult, Sweden

[21] Appl. No.: 211,185
[22] PCT Filed: Sep. 25, 1992
[86] PCT No.: PCT/SE92/00677
 § 371 Date: Apr. 5, 1994
 § 102(e) Date: Apr. 5, 1994
[87] PCT Pub. No.: WO93/06464
 PCT Pub. Date: Apr. 1, 1993

[30] Foreign Application Priority Data
Sep. 27, 1991 [SE] Sweden .................. 9102806

[51] Int. Cl.6 ............... D03D 47/00; G01N 21/84; G01P 13/00
[52] U.S. Cl. ................. 250/561; 250/571; 139/370.1; 356/429
[58] Field of Search ........ 250/561, 571, 560, 559, 250/562, 572, 228; 139/370.1, 370.2; 356/429, 430, 431

[56] References Cited
U.S. PATENT DOCUMENTS

| | | | |
|---|---|---|---|
| 4,716,942 | 1/1988 | Jensen et al. | 250/571 |
| 4,738,284 | 4/1988 | Ishikawa et al. | 250/561 |
| 4,852,617 | 8/1989 | Hamer et al. | 139/370.2 |
| 4,963,757 | 10/1990 | Lietde et al. | 250/571 |
| 4,994,680 | 2/1991 | Brügmann | 250/561 |
| 5,182,457 | 1/1993 | Hagmann | 250/572 |
| 5,329,961 | 7/1994 | Bouvyn et al. | 250/561 |

Primary Examiner—David C. Nelms
Assistant Examiner—John R. Lee
Attorney, Agent, or Firm—Antonelli, Terry, Stout & Kraus

[57] ABSTRACT

The present invention relates to an apparatus for optical monitoring of whether a thread is in motion or not in a determined direction in a region illuminated by one or more light sources, the region being a part, illuminated by the light source (5), of a channel (2) with light-reflecting walls (4, 6, 7, 10, 11, 12), through which the thread extends, and at least one light-sensitive element (8, 9) is placed in said part of the channel (2) in such a manner that the optical axes (13, 14, 15) of the light source (5) and the light-sensitive element (8, 9) make an angle with each other, whereby the optical coupling between the light source (5) and the light-sensitive element (8, 9) is influenced by the vibrations occurring in the thread during its motion, e.g. the microvibrations, the changes in the optical coupling being reflected in amplitude variations of a signal from the light-sensitive element (8, 9).

11 Claims, 2 Drawing Sheets

5,424,557

APPARATUS FOR MONITORING WEFTS OR THREADS

BACKGROUND OF THE INVENTION

The present invention relates to an apparatus for optical monitoring of whether a thread or weft is in motion or not in a region illuminated by one or more light sources.

Prior art contact-free signal emitters of the optical type permit substantially only sensing of the presence of and/or slight and/or slow movements of a thread or a weft. In many cases, it is desirable to establish not only whether a thread or weft is located at a given position but moreover whether the thread or the weft is in motion in a determined direction at the desired location. Prior art optical signal emitters do not carry this feature and particularly not so if the thread is extremely thin and/or has a smooth or shiny surface.

SUMMARY OF THE INVENTION

The object forming the basis of the present invention is to satisfy the above-outlined desiderata and, in such instance, in apparatuses of the type disclosed by way of introduction, to obviate or at least reduce to a minimum the drawbacks as outlined above.

This task is solved according to the present invention in an apparatus of the type disclosed by way of introduction in that the region is a part, illuminated by the light source, of a channel with light-reflecting walls, through which the thread or weft extends, that at least one light-sensitive element is placed in said part of the channel in such a manner that their optical axes make an angle with one another, whereby the optical coupling between the light source and the light-sensitive element is influenced by the vibrations occurring in the thread during its movement, for example microvibrations, the changes in the optical coupling being reflected in amplitude variations of a signal from the light-sensitive element. In one plane transversely of the channel, the light source is located in the wall of the channel and is directed towards the longitudinal axis of the channel, while a light-sensitive element is located on either side of the light source in the same plane and is directed towards the longitudinal axis of the channel, the angle between the optical axis of the light source and the optical axis of the light-sensitive elements being such that none impinges on any of the others. The reflecting wall in the channel is arched so that the reflection in the channel will be irregular or chaotic. The light source is placed in an outwardly arched portion of the wall of the channel, which, on both sides thereof, is inwardly arched, that the light-sensitive element is placed at the end of the inwardly arched portion, whereafter the wall is outwardly arched until the outwardly arched portions meet in an inwardly arched portion substantially in register with the light source. A substantially circular translucent wall is disposed in the channel for forming a thread channel, and the space between the said wall and the reflecting wall of the channel is sealed at the ends in order to avoid dirt contamination.

An apparatus according to the present invention makes possible extraordinarily reliable sensing or monitoring of whether a thread or a weft is in motion in a determined direction and this in particular when the thread is extremely thin and has a smooth surface. It has also proved possible to monitor non light-reflective threads and in addition translucent threads.

BRIEF DESCRIPTION OF THE DRAWINGS

The present invention will now be described in greater detail hereinbelow, with particular reference to the accompanying Drawings.

DETAILED DESCRIPTION OF THE INVENTION

Figure 1:
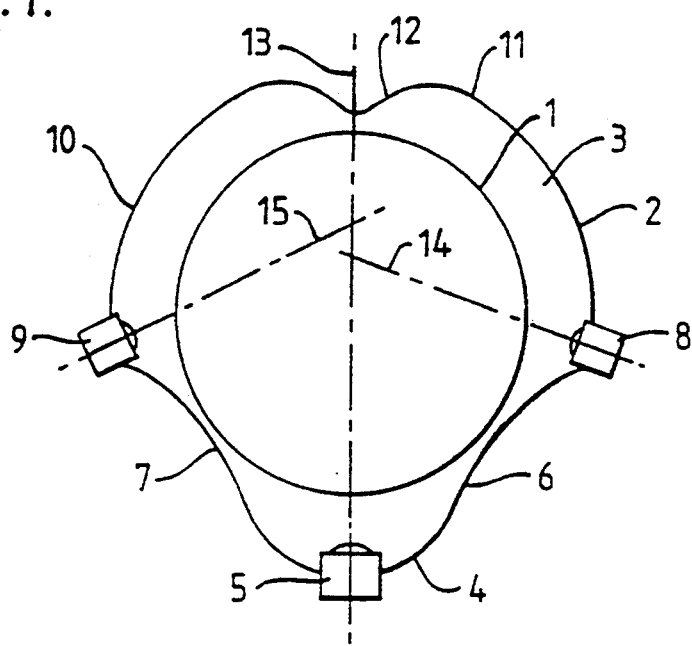
FIG. 1 is a schematic cross section through a sensing region in one embodiment of an apparatus according to the present invention for illustrating the principle thereof.

The schematic section illustrated in FIG. 1 in one embodiment of an apparatus according to the present invention illustrates a plane transversely through a region in which it is desirable to monitor a weft or a thread in respect of whether the thread or the weft is in motion in a determined direction, e.g. in the plane of the Drawing. The region is defined laterally by a substantially circular wall 1 which is translucent above all for IR light. The wall 1 has a certain desired axial extent and forms a channel through which extends the thread or weft.

About the substantially circular wall 1, there is provided a reflector 2 composed of a number of variously arched portions. The reflector 2 has substantially the same axial extent as the substantially circular wall 1, and the space 3 formed between the wall 1 and the reflector 2 is sealed at its ends so as not to be subjected to any dirt contamination.

A light source 5 is mounted in an outwardly arched portion 4 of the reflector 2. On both sides of the light source 5, there are connected two inwardly arched portions 6 and 7 to the outwardly arched portion 4. At the opposite end of the inwardly arched portions 6 and 7 in relation to the portion 4, there is mounted a light-sensitive element 8, 9. From the light-sensitive elements 8 or 9, the reflector 2 has outwardly arched portions 10 and 11 which are interconnected with one another by means of an inwardly arched portion 12 substantially in register with the light source 5.

The optical axis of the light source 5 is intimated by means of a ghosted line 13 and the optical axis of the light-sensitive element 8 is intimated by a ghosted line 14, while the optical axis of the light-sensitive element 9 is intimated by a ghosted line 15. The angles between the optical axes 13, 14 and 15 are not equal in the illustrated embodiment and the optical axes 13, 14 and 15 do not intersect one another at the same point, but this is not a necessity; the angles may instead be equal and the axes intersect one another the same point.

The light source 5 is preferably an LED for emitting at least IR light in the direction of the optical axis 13 and with per se known spread towards the reflector 2, whereby the light from the light source 5 is reflected in at least the illustrated region. As a result of the design of the reflector 2 with the parts 4, 6, 7, 10, 11 and 12 illustrated in FIG. 1, there will be obtained such a reflection profile of the light that this may be considered as forming a chaos profile which in itself is homogeneous or uniform throughout the entire region where the thread or the weft is to be monitored and thereby within the entire channel formed by the wall. In such a manner, there will be obtained as uniform and balanced light sensitivity as possible throughout the entirety of the channel formed by the wall 1.

The light-sensitive elements 8 and 9 are preferably phototransistors or photodiodes and, as is apparent from FIG. 1, their optical axes 14 and 15, respectively, are directed such that they do not impinge upon the light source 5, whereby it is easier to influence the optical coupling between the light source 5 and the light-sensitive elements 8 and 9. It has proved to be possible with considerable reliability to sense the slight microvibrations which occur in a smooth thread in motion through the region formed by the substantially circular wall 1, irrespective of where in the region the thread is located. This is of major importance, since the diameter of the channel may be of the order of magnitude of 5 mm, while the diameter of the thread may be a fraction of one millimeter.

Figure 6:
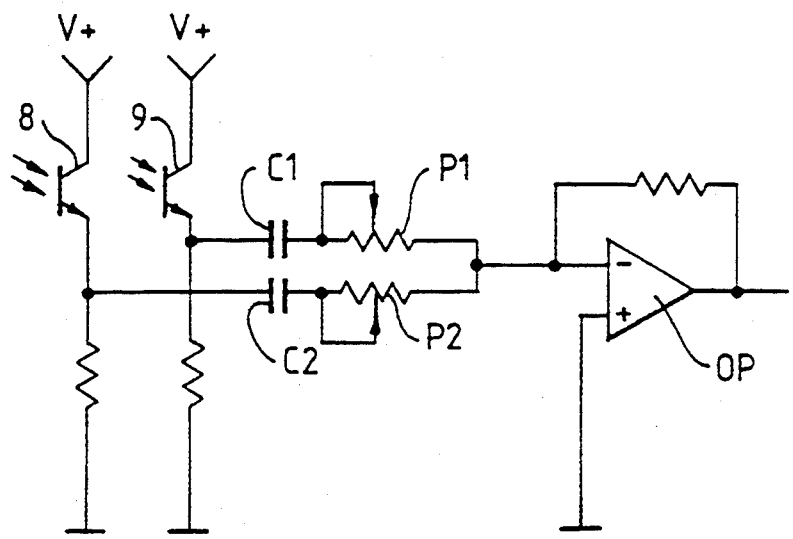
FIG. 6 shows a skeleton coupling diagram for generating a monitoring signal.

The light-sensitive elements 8 and 9 are coupled-in to the electronics circuit illustrated in FIG. 6 which is extremely known to a person skilled in the art and shows the light-sensitive elements 8, 9 coupled to the negative input to an operational amplifier OP each via their potentiometer P1, P2 and their capacitor C1, C2. On the output of the operational amplifier OP, there will be obtained a signal whose amplitude is dependent upon the optical coupling between the light source 5 and the light-sensitive elements 8, 9. By selection of a suitable frequency for activating and deactivating the light source 5 by feeding a signal of suitable frequency, eg to the light source, the signal from the operational amplifier OP can be filtered by means of suitable band pass filters which make possible establishment of true motion on the part of a thread in motion in the plane of the Drawing of FIG. 1.

In the plane illustrated in FIG. 1, a chaos profile will be created according to the present invention. This plane is at right angles to the thread movement. The term chaos profile is taken to signify that the optical link between the light source 5 and the light-sensitive elements 8, 9 is extremely less homogeneous, whereby slight movements or displacements in the plane illustrated in FIG. 1 give tangible variations in the optical coupling.

The chaos profile is realised with the aid of an as good as circular reflector 2 and a determined mutual placing of the light source 5 and the light-sensitive elements 8 and 9, so that the multiple reflections generate the chaos. It should here be observed that there may be more light sources and more light-sensitive elements than illustrated in FIG. 1 and described in the foregoing.

FIGS. 2–5 illustrate a prototype of one embodiment of an apparatus according to the present invention, in which the reflector 2 consists of a polished through hole 16, the light source 5 being mounted in a hole 17 and the light-sensitive element being mounted on a surface 18 with an aperture 19 into the hole or channel 16. The optical axes will, in this case, make a 90° angle with one another and the reflector will obviously not be completely circular but consist of two part-circular portions as is most clearly apparent from FIG. 3. On final testing of the prototype illustrated in FIGS. 2–5, it was found that the principles described in connection with FIG. 1 corresponded to desired expectations, even though it was found that it is suitable to provide two light-sensitive elements for achieving as uniform sensitivity throughout the entire channel as possible.

Figure 7:
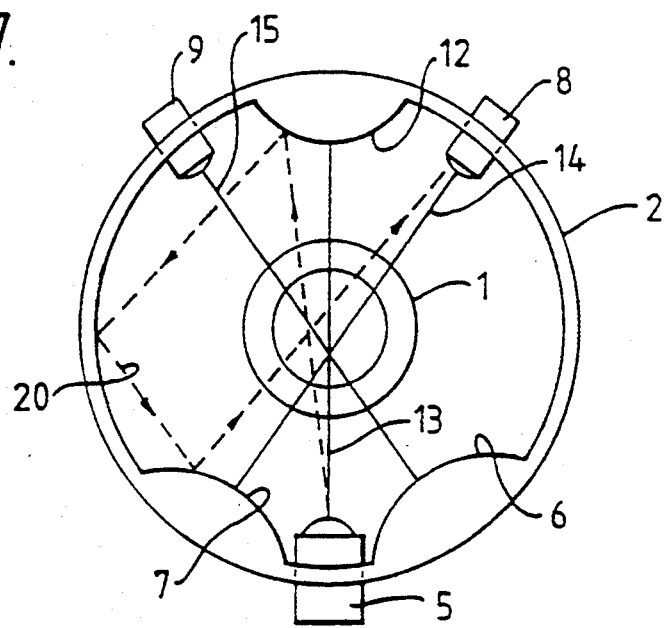
FIG. 7 shows a similar section to that of FIG. 1 of another embodiment of the present invention.
Figure 2:
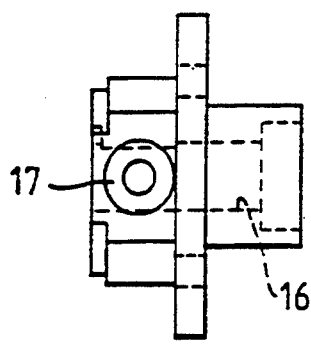
FIG. 2 is a side elevation of a prototype of another embodiment of an apparatus according to the present invention.
Figure 3:
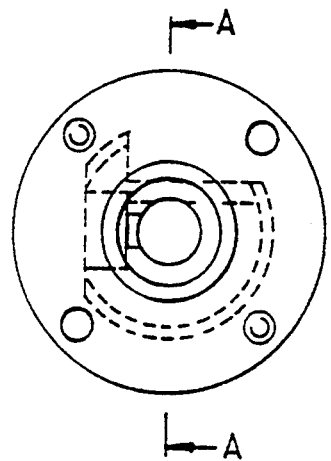
FIG. 3 shows an end elevation from the right in FIG. 2 of the prototype.
Figure 4:
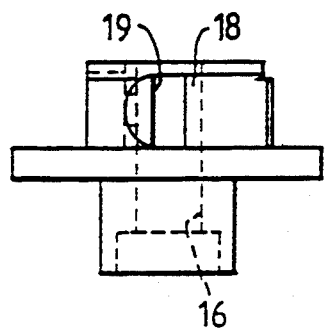
FIG. 4 is a top plan view of the end view in FIG. 3.
Figure 5:
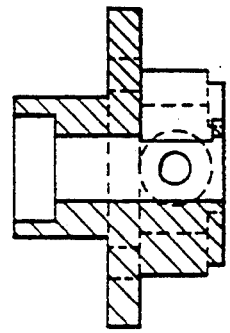
FIG. 5 shows a section taken along the line A—A in FIG. 3.

In FIG. 7, the same reference numerals are employed as in FIG. 1 for corresponding pads. The difference between the two embodiments resides in the fact that the embodiment illustrated in FIG. 7 is substantially circular and that the reflecting wall 2 is also substantially circular with a marked inward bulge 6, 7 on either side of the light source 5 and a marked inward bulge 12 between the light sensitive elements 8, 9. Furthermore, the translucent wall consists of a portion of a glass tube 1. A broken line 20 illustrates how a portion of the light from the light source is reflected on the light-reflecting walls and passes through the tube 1.

I claim:

1. An apparatus for optical monitoring of whether a thread or a weft is in motion or not in a region illuminated by one or more light sources (5), characterized in that the region is a part, illuminated by the light source (5), of a channel with light-reflecting walls (2), through which the thread extends; that at least one light-sensitive element (8, 9) is placed in said part of the channel (1) in such a manner that the optical axes (13, 14, 15) of the light source (5) and the light-sensitive element (8, 9) make an angle with one another, whereby the optical coupling between the light source (5) and the light-sensitive element (8, 9) is influenced by the vibrations occurring in the thread during its motion, the changes in the optical coupling being reflected in amplitude variations of a signal from the light-sensitive element (8, 9).

2. The apparatus as claimed in claim 1, characterized in that in a plane transversely of the channel (1), the light source (5) is located in the wall (2) of the channel and is directed towards the longitudinal axis of the channel, while a light-sensitive element (8, 9) is located on either side of the light source (5) in the same plane and is directed towards the longitudinal axis of the channel, the angle between the optical axis (13) of the light source and the optical axes (14, 15) of the light-sensitive elements being such that none impinges on any of the others.

3. The apparatus as claimed in claim 1 or 2, characterized in that the reflecting wall (2) in the channel is arched such that the reflection in the channel will be irregular or chaotic.

4. The apparatus as claimed in claim 3, characterized in that the light source (5) is placed in an outwardly arched portion (4) of the wall of the channel, which on either side thereof is inwardly arched (6, 7); that the light-sensitive element (8, 9) is placed at the end of the inwardly arched portion (6, 7), whereafter the wall is outwardly arched (10, 11) until the outwardly arched portions (10, 11) meet in an inwardly arched portion (12) substantially in register with the light source (5).

5. The apparatus as claimed in claim 1 or 2, characterized in that a substantially circular translucent wall (1) is disposed in the channel for forming a thread channel; and that the space (3) between said wall (1) and the reflecting wall (2) of the channel is sealed at its ends to avoid dirt contamination.

6. The apparatus as claimed in claim 5, characterized in that the translucent wall is a glass tube (1).

7. The apparatus as claimed in claim 1 or 2, characterized in that the reflecting wall (2) in the channel is substantially circular with an inward bulge on either side of the light source (5) and an inward bulge between the light-sensitive elements (8, 9).

8. The apparatus as claimed in claim 3, characterized in that a substantially circular translucent wall (1) is disposed in the channel for forming a thread channel, and that the space (3) between said wall (1) and the reflecting wall (2) of the channel is sealed at its ends to avoid dirt contamination.

9. The apparatus as claimed in claim 8, characterized in that the translucent wall is a glass tube (1).

10. The apparatus as claimed in claim 4, characterized in that a substantially circular translucent wall (1) is disposed in the channel for forming a thread channel, and that the space (3) between said wall (1) and the reflecting wall (2) of the channel is sealed at its ends to avoid dirt contamination.

11. The apparatus as claimed in claim 10, characterized in that the translucent wall is a glass tube (1).

* * * * *